United States Patent
Fujimaki et al.

(10) Patent No.: US 10,454,353 B2
(45) Date of Patent: Oct. 22, 2019

(54) APPARATUS FOR MANUFACTURING INTERIOR PERMANENT MAGNET-TYPE INNER ROTOR AND MANUFACTURING METHOD USING SAME

(71) Applicant: AICHI STEEL CORPORATION, Tokai-shi, Aichi (JP)

(72) Inventors: Tadashi Fujimaki, Aichi-ken (JP); Hiroshi Matsuoka, Aichi-ken (JP); Yoji Hashimoto, Aichi-ken (JP)

(73) Assignee: AICHI STEEL CORPORATION, Tokai-shi, Aichi-ken (JP)

( * ) Notice: Subject to any disclaimer, the term of this patent is extended or adjusted under 35 U.S.C. 154(b) by 225 days.

(21) Appl. No.: 15/300,904

(22) PCT Filed: Mar. 12, 2015

(86) PCT No.: PCT/JP2015/057390
§ 371 (c)(1),
(2) Date: Sep. 30, 2016

(87) PCT Pub. No.: WO2015/151760
PCT Pub. Date: Oct. 8, 2015

(65) Prior Publication Data
US 2017/0025933 A1 Jan. 26, 2017

(30) Foreign Application Priority Data
Apr. 2, 2014 (JP) .............................. 2014-076484

(51) Int. Cl.
*H02K 15/03* (2006.01)
*H02K 15/12* (2006.01)
(Continued)

(52) U.S. Cl.
CPC .......... *H02K 15/03* (2013.01); *H01F 13/003* (2013.01); *H01F 41/0253* (2013.01); *H02K 15/12* (2013.01); *H02K 1/276* (2013.01)

(58) Field of Classification Search
CPC ... H01F 13/003; H01F 41/0253; H02K 15/03; H02K 15/12; H02K 1/276
See application file for complete search history.

(56) References Cited

U.S. PATENT DOCUMENTS 5,199,171 A * 4/1993 Umezawa ........... B29C 45/0053
264/229
7,854,056 B2 * 12/2010 Watanabe .............. H02K 15/03
29/596
(Continued)

FOREIGN PATENT DOCUMENTS

EP        1 176 700 A2    1/2002
EP        1 793 479 A1    6/2007
(Continued)

OTHER PUBLICATIONS

Japanese Notification of Reasons for Refusal issued in JP 2014-076484 dated Oct. 13, 2015.
(Continued)

*Primary Examiner* — Minh N Trinh
(74) *Attorney, Agent, or Firm* — Sughrue Mion, PLLC

(57) ABSTRACT

An apparatus for manufacturing an interior permanent magnet-type inner rotor and manufacturing method using the same. The apparatus including: a mold having a three-layer structure; the method including a shrink fitting step of heating a rotor core having slots; and a filling step of filling the rotor core slots in a residual heat state after the shrink fitting step with a flowable mixture of a binder resin heated to a flowable state and having anisotropic magnet particles, in oriented magnetic fields. This allows, in similar manufacturing steps, an inner rotor of which magnetic poles are anisotropic bond magnets formed by solidifying the flowable mixture in the slots and a conventional inner rotor of which the magnetic poles are sintered magnets. This allows both the inner rotors concurrently and in parallel (mixed flow production) in an already existing IPM motor manufacturing line.

2 Claims, 6 Drawing Sheets

(51) Int. Cl.
*H01F 13/00* (2006.01)
*H01F 41/02* (2006.01)
*H02K 1/27* (2006.01)

(56) References Cited

U.S. PATENT DOCUMENTS

| | | | | |
|---|---|---|---|---|
| 2007/0271772 | A1* | 11/2007 | Malvestiti | B21D 28/12 |
| | | | | 29/732 |
| 2008/0284267 | A1* | 11/2008 | Purvines | H02K 1/2733 |
| | | | | 310/112 |
| 2014/0338184 | A1* | 11/2014 | Kaiser | H02K 15/03 |
| | | | | 29/598 |
| 2017/0025933 | A1* | 1/2017 | Fujimaki | H02K 15/03 |

FOREIGN PATENT DOCUMENTS

| | | | |
|---|---|---|---|
| JP | 11-206075 | A | 7/1999 |
| JP | 2000-092762 | A | 3/2000 |
| JP | 2000166190 | A | 6/2000 |
| JP | 2003-244903 | A | 8/2003 |
| JP | 2003-299291 | A | 10/2003 |
| JP | 2008-172965 | A | 7/2008 |
| JP | 2010-074926 | A | 4/2010 |
| JP | 2012-161209 | A | 8/2012 |
| JP | 2014-057433 | A | 3/2014 |

OTHER PUBLICATIONS

International Search Report of PCT/JP2015/057390 dated Jun. 16, 2015.
Communication dated Apr. 24, 2017, from the European Patent Office in counterpart European application No. 15773191.0.

* cited by examiner

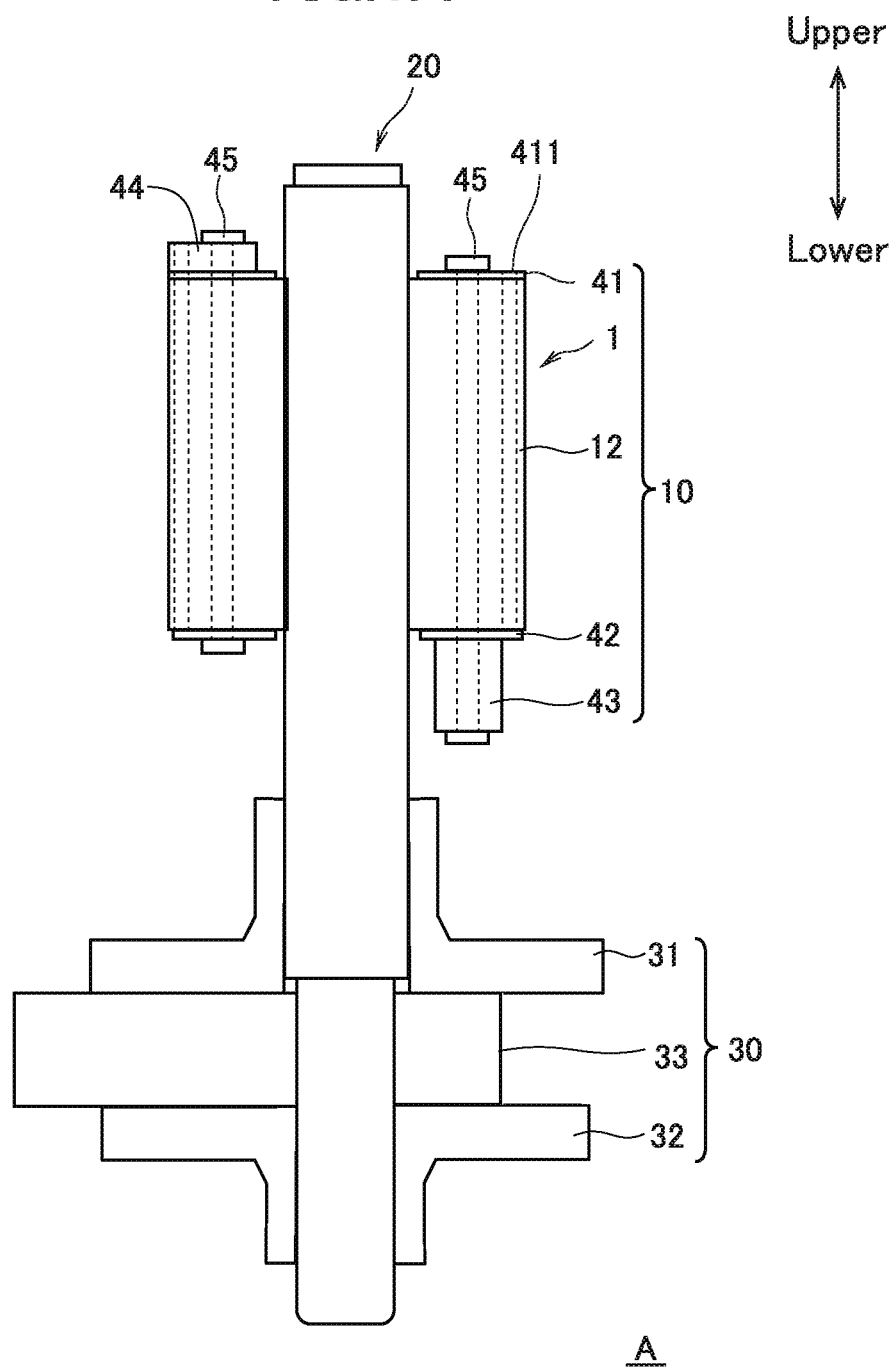

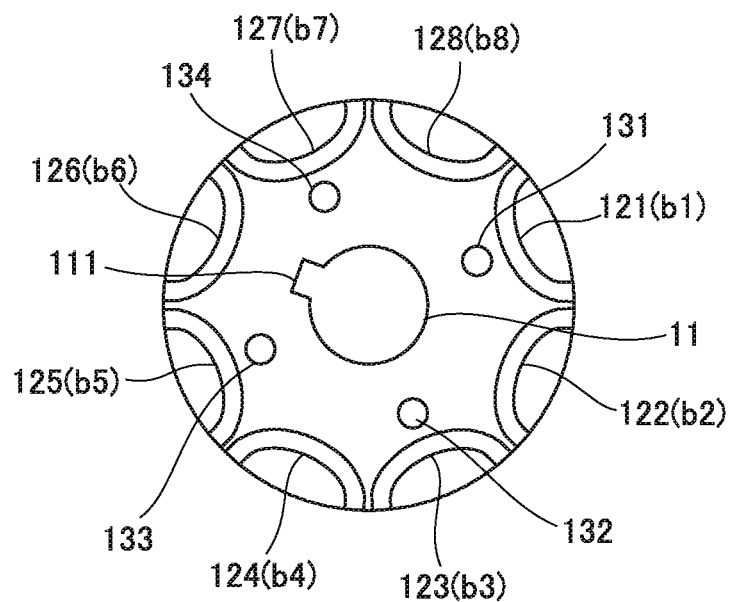

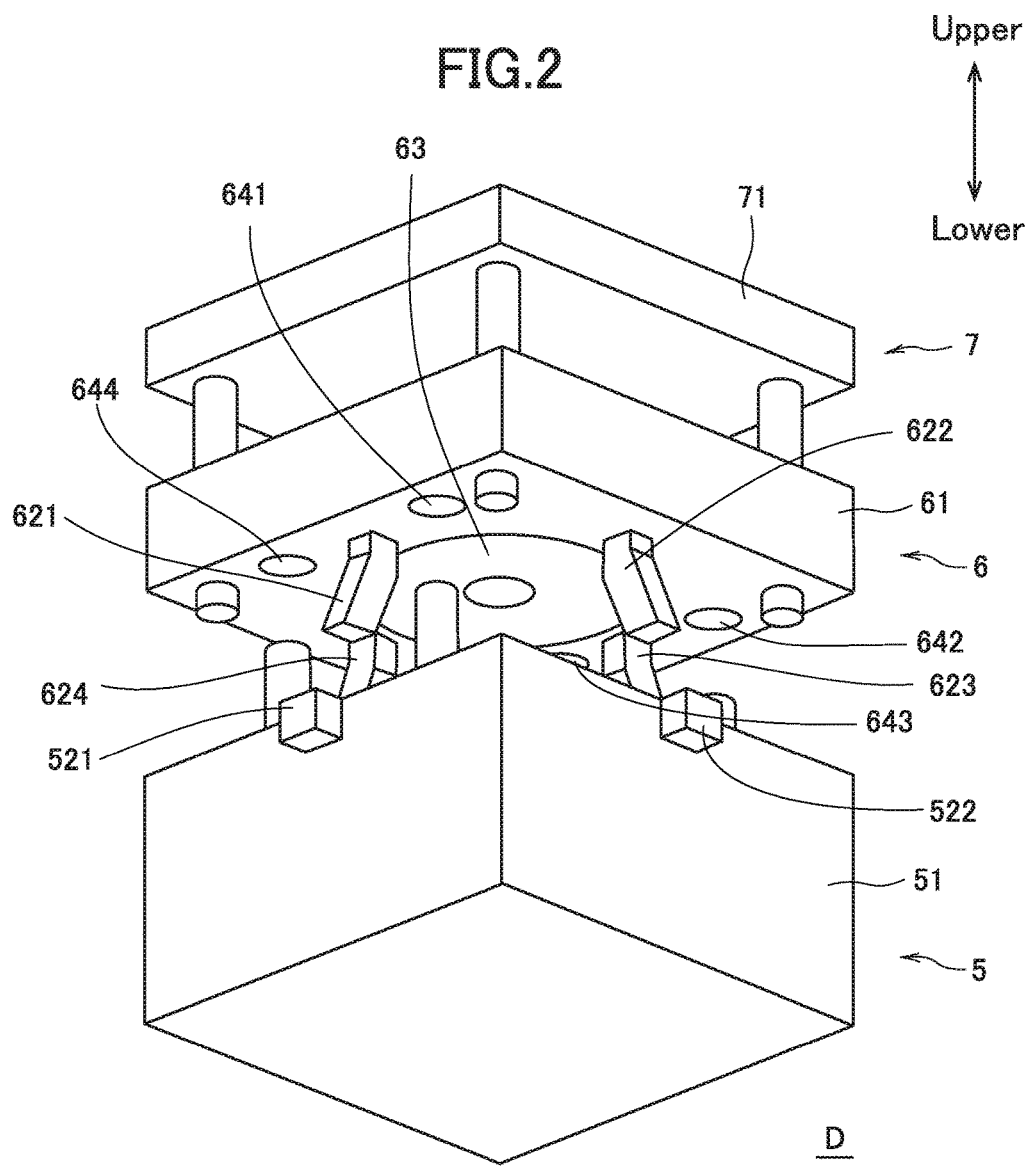

APPARATUS FOR MANUFACTURING INTERIOR PERMANENT MAGNET-TYPE INNER ROTOR AND MANUFACTURING METHOD USING SAME

CROSS REFERENCE TO RELATED APPLICATIONS

This application is a National Stage of International Application No. PCT/JP2015/057390 filed Mar. 12, 2015, claiming priority based on Japanese Patent Application No. 2014-076484 filed Apr. 2, 2014, the contents of all of which are incorporated herein by reference in their entirety.

TECHNICAL FIELD

The present invention relates to a method and apparatus for manufacturing an interior permanent magnet-type inner rotor of which the magnetic poles are anisotropic bond magnets.

BACKGROUND ART

There are various types of electric motors (referred simply to as "motors," including generators). In recent years, synchronous motors are focused on, with which electric power saving, high efficiency, high torque or high output can be expected, in accordance with the development of inverter control and the spread of rare-earth magnets having high magnetic characteristics.

The synchronous motor is a motor that may comprise permanent magnets for the rotor and an armature coil for the stator, i.e. an AC motor in which the armature coil is supplied with an alternate current (AC) to generate a rotating magnetic field around the stator, thereby driving the rotor. Synchronous motors are classified into surface permanent magnet synchronous motors (referred simply to as "SPM motors") in which the permanent magnets are disposed on the surface of the rotor and interior permanent magnet synchronous motors (referred simply to as "IPM motors") in which the permanent magnets are disposed inside the rotor. Nowadays, the IPM motors are becoming mainstreams because the enhanced torque and electric power saving can be achieved owing to the magnet torque and the reluctance torque in accordance with the salient pole ratio and the reliability can also be improved since the permanent magnets are prevented from flying away.

For conventional IPM motors, an interior permanent magnet-type inner rotor has been used, in which the magnetic poles are made by inserting sintered rare-earth magnets into slots of the rotor core. The sintered rare-earth magnets are obtained, such as by cutting and polishing the magnets into predetermined dimensions. However, despite a small degree of freedom in forming a sintered magnet, the cross-sectional shape of a magnet with consideration for the optimized design may often be approximately a circular arc shape or an elliptical shape. In addition, the radius of curvature of the inner circumferential side surface and that of the outer circumferential side surface may be different and the thickness of magnet may vary in the circumferential direction. Such processing of magnets is difficult and the use of sintered magnets may thus lead to high cost. Moreover, defects and the like are likely to occur when the magnets are inserted into the slots. Accordingly, it has been compelled to use sintered magnets of a simple shape such as a plate-like shape in many IPM motors. In such circumstances, Patent Literature 1 below proposes an interior permanent magnet-type inner rotor (which may be referred to as an "IPM inner rotor" or referred simply to as an "inner rotor") having magnetic poles of anisotropic rare-earth bond magnets that are molded by injecting a flowable mixture of anisotropic rare-earth magnet power and a binder resin into the slots in oriented magnetic fields. Note, however, that Patent Literature 1 merely describes a single body of the inner rotor.

CITATION LIST

Patent Literature

[PTL 1]
JP11-206075A
[PTL 2]
JP2000-92762A
[PTL 3]
JP2003-244903A
[PTL 4]
JP2003-299291A

SUMMARY OF INVENTION

Technical Problem

An inner rotor may often be fixed to a rotating shaft as that of a motor or as the driving shaft of a device by shrink fitting. This shrink fitting is performed by heating the inner rotor to a high temperature (ordinarily 300 to 500 degrees C.). Under the influence of this heating, the magnetic force of permanent magnets embedded in the inner rotor decreases (i.e., thermal demagnetization occurs). For this reason, conventional permanent magnets are designed in expectation of the thermal demagnetization, which leads accordingly to an increased size of permanent magnets and therefore of IPM motors and an increased use amount of scarce rare-earth elements.

In view of the above, many proposals are made to suppress the thermal demagnetization of permanent magnets which occurs when the inner rotor is shrink-fitted to the rotating shaft. Relevant descriptions are disclosed, for example, in the above Patent Literature 2 and 3. In each case, however, the inner rotor in which permanent magnets (sintered magnets or bond magnets) are embedded is still heated to be shrink-fitted to the rotating shaft, and the thermal demagnetization of the permanent magnets occur to a greater or lesser extent during the shrink fitting.

Here, it may be considered to perform loading or the like of sintered magnets into the slots after shrink-fitting the rotor core to the rotating shaft. In such manufacturing steps, however, various problems in manufacturing may occur, such as that rivet fixing is necessary after the loading or the like.

Sintered magnets are ordinarily loaded into slots of the inner rotor in an unmagnetized state in view of the workability and handling ability, and the magnetization is performed after the inner rotor is shrink-fitted to the rotating shaft. This magnetization may sometimes be performed by disposing the inner rotor in the stator and thereafter causing an instantaneous large current (pulse current) to flow through the stator coil (such magnetization is referred to as "built-in magnetization"). However, if the built-in magnetization is performed, the strong magnetic force generated during the magnetization attracts the stator coil to the outer circumferential side of the inner rotor and may cause deformation and the like. To avoid this, dedicated countermeasure may be necessary (see Patent Literature 4).

The present invention has been made in view of such circumstances and an object of the present invention is to provide a method of manufacturing an interior permanent magnet-type inner rotor (referred simply to as an "inner rotor") that does not cause thermal demagnetization of the interior permanent magnets even when the rotor core is fixed to the rotating shaft by shrink fitting. Another object of the present invention is to provide a manufacturing apparatus suitable for manufacturing an interior permanent magnet-type inner rotor in which an associated rotating body is fixed together with the rotor core to the rotating shaft, such as by shrink fitting.

Solution to Problem

As a result of intensive studies to achieve the above objects and repeating trial and error, the present inventors have conceived of an idea of shrink-fitting the rotor core to the rotating shaft and thereafter filling and molding anisotropic bond magnets to be magnetic poles into the slots. Further embodying and developing this idea, the present inventors have accomplished the present invention as will be described hereinafter.

«Method of Manufacturing Interior Permanent Magnet-Type Inner Rotor»

(1) The manufacturing method of the present invention is characterized by comprising: a shrink fitting step of heating a rotor core provided at its middle with a shaft hole and inserting a rotating shaft into the shaft hole to shrink-fit the rotor core to the rotating shaft, the rotor core having a plurality of slots arranged evenly around the shaft hole; and a filling step of filling the slots of the rotor core in a residual heat state after the shrink fitting step with a flowable mixture in oriented magnetic fields, the flowable mixture being a mixture of a binder resin heated to a flowable state and anisotropic magnet particles, wherein an interior permanent magnet-type inner rotor is obtained in which anisotropic bond magnets obtained by solidifying the flowable mixture in the slots are magnetic poles.

(2) In the method of manufacturing an interior permanent magnet-type inner rotor (which may be referred to as an "inner rotor" or simply to as a "rotor") of the present invention, the rotor core is shrink-fitted to the rotating shaft before filling and molding of anisotropic bond magnets to be magnetic poles and thereafter the slots of the rotor core are filled with the flowable mixture in the oriented magnetic fields while utilizing the residual heat, thereby to mold the anisotropic bond magnets to be the magnetic poles. Therefore, the anisotropic bond magnets according to the present invention are not exposed to high temperatures during the shrink fitting and the thermal demagnetization is avoided. Moreover, in the manufacturing method of the present invention, the flowable mixture is filled into the slots of the rotor core which is in a heated state owing to the residual heat during the shrink fitting. Therefore, the flowability of the flowable mixture in the slots is sufficiently ensured without purposely heating the rotor core at the time of filling, and dense anisotropic bond magnets can be molded in the slots.

Thus, according to the manufacturing method of the present invention, the anisotropic bond magnets, which exhibit magnetic force in accordance with the content of the anisotropic magnet particles, are formed in the slots, and the inner rotor and therefore the IPM motor can be reduced in size and cost.

In a conventional method of manufacturing an inner rotor in which sintered magnets are loaded into slots, shrink fitting is also performed. Comparing this conventional manufacturing method and the manufacturing method of the present invention, they are different in that the time when the permanent magnets are disposed in the slots is before the shrink fitting or after the shrink fitting, but both the manufacturing methods involve similar steps. Therefore, the manufacturing method of the present invention can readily be substituted for or mixed with the conventional manufacturing method.

This aspect will be described in detail with reference to specific examples. Assuming that steps of manufacturing a motor using sintered magnets are changed to steps of manufacturing a motor using anisotropic rare-earth bond magnets, essentially different points are merely the material quality and shape of the magnets, the shape of the slots in the rotor, the method of inserting the magnets into the slots, and the timing of the insertion. Other points, such as a stator and control circuit, for example, are not different between both the motors, and the installation of the motors, working and the like can be similarly performed using the existing facilities. Moreover, by changing the motor which uses the sintered magnets to the motor which uses the anisotropic bond magnets, omission of some steps, energy saving and the like can be achieved, as described above.

Accordingly, a space for manufacturing motors using anisotropic rare-earth bond magnets is provided in an adjacent space to an existing line for manufacturing motors using sintered magnets, for example, and an additional zone is provided for receiving components and the like from the preceding steps and processing and sending them to the subsequent steps as in the case of manufacturing motors using sintered magnets. This scheme allows the existing motor line using sintered magnets and the motor line using anisotropic rare-earth bond magnets to coexist.

The facility investment necessary for forming such coexisting lines is not more than preparation of a general-purpose resin filling and molding machine and a magnetic field forming mold responsible to the product shape. In other words, situations anticipated in general can be avoided, such as large investment for reservation of location place, construction of buildings, new construction of manufacturing facilities for the total steps, and the like. Thus, according to the manufacturing method of the present invention, the facility investment can be drastically reduced even when motors using sintered rare-earth magnets are shifted to motors using anisotropic rare-earth bond magnets.

In the inner rotor according to the present invention, the magnetic poles are composed of anisotropic bond magnets that are formed by filling and molding. Therefore, the degree of freedom in the shape of slots is larger than that of the conventional inner rotor in which the magnetic poles are composed of sintered magnets, and the magnetic poles can be arranged at accurate locations without formation of air gaps and the like in the slots. Also from such viewpoints, the inner rotor according to the present invention can be used to readily promote the enhanced performance, reduced size, reduced cost and the like of IPM motors.

(3) In the manufacturing method of the present invention, the temperature of the rotor core during the shrink fitting step or filling step is not limited. The rotor core is ordinarily heated to about 200 to 500 degrees C. during the shrink fitting step, but the temperature of the rotor core during the filling step may be about 50 to 200 degrees C. in an embodiment or 100 to 150 degrees C. in another embodiment. The temperature during the shrink fitting is appropriately determined in accordance with the tightening margin between the rotor core and the rotating shaft (torque generated between the inner rotor and the rotating shaft) and the like, and the temperature during the filling is appropriately determined in accordance with the type of binder resin, composition of the flowable mixture and the like. It is therefore preferred that the filling step according to the present invention includes a temperature adjusting step of adjusting the temperature of the rotor core (which may be referred to as a "core temperature") to a temperature suitable for filling the slots with the flowable mixture so that dense anisotropic bond magnets are efficiently formed in the slots. In general, the temperature during the shrink fitting is considerably higher than the temperature during the filling and it is thus preferred that the temperature adjusting step is a cooling step of cooling the temperature of the rotor core during the shrink fitting to a temperature suitable for the filling.

In the filling step according to the present invention, the slots to which oriented magnetic fields are applied are filled with a flowable mixture of anisotropic magnet particles and a binder resin. During this operation, the anisotropic magnet particles come to a state in which the magnetization easy axes are aligned in the oriented magnetic fields direction and a state in which magnetization is substantially achieved in accordance with the intensity of the oriented magnetic fields. That is, the anisotropic bond magnets formed in the slots after the filling step are permanent magnets that already develop strong magnetic force after the resin is hardened. Therefore, according to the manufacturing method of the present invention, the manufacturing steps can be simplified because a magnetizing step need not be separately performed to the anisotropic bond magnets after the filling step, which is different from the case of inserting the magnets into the slots and thereafter separately performing a magnetizing step as in the conventional manufacturing method using sintered magnets as the magnetic poles.

Note, however, that the manufacturing method of the present invention does not necessarily exclude a magnetizing step. In particular, when inner rotors having anisotropic bond magnets as the magnetic poles and inner rotors having sintered magnets as the magnetic poles coexist in the same factory or in the same line, it may be preferred to perform a magnetizing step even in the case of the manufacturing method of the present invention because it is possible to reduce the difference of steps for both the inner rotors and the difference in performance of the inner rotors.

(4) Specific method of heating (such as heating in a furnace and high-frequency heating) necessary for performing the shrink fitting step according to the present invention and the heating conditions (such as heating temperature and heating time) are appropriately selected in accordance with the specs of the inner rotor. Similarly, in the filling step, the type of a filling and molding machine to be used (such as injection molding machine, transfer molding machine, vertical type, horizontal type, dedicated machine, and general-purpose machine), the injection conditions (such as injection temperature, injection pressure, and injection time), and the oriented magnetic field conditions (such as orientation intensity, applying time, and applying method) are appropriately selected in accordance with the properties of the flowable mixture and the specs of the inner rotor.

The manufacturing method of the present invention can be easily carried out when using permanent magnets, rather than electromagnets (magnet coils), as magnetomotive sources for the oriented magnetic fields to be applied to the flowable mixture in the slots during the filling step because the permanent magnets allow not only energy saving but also the use of a downsized and simplified mold or molding apparatus and, for example, a general-purpose injection molding machine and other similar machines can easily be utilized.

In this regard, the filling step according to the present invention may preferably be a step performed such that the rotor core is disposed in an orienting mold comprising a housing part that can house the rotor core, a plurality of orienting yokes that are arranged evenly around the housing part and induce oriented magnetic fields to be applied to the slots, and permanent magnets that are oriented magnetic field sources arranged around the orienting yokes.

To the rotating shaft to which the rotor core is shrink-fitted, an associated material other than the inner rotor may often be fixed (not limited to being fixed by shrink fitting) in accordance with the specs and intended use of the IPM motor. Therefore, the filling step according to the present invention may be a step performed in a state in which an associated rotating body other than the rotor core is fixed to the rotating shaft. However, it may be difficult to perform the filling step due to the arrangement and size of the associated rotating body and the like. Even in such a case, when the manufacturing apparatus of the present invention described below is used, the inner rotor can be manufactured while utilizing, for example, a general-purpose injection molding machine, etc.

《Apparatus for Manufacturing Interior Permanent Magnet-Type Inner Rotor》

(1) The present invention can be perceived not only as the above-described manufacturing method but also as a manufacturing apparatus suitable for carrying out the manufacturing method. That is, the present invention can be perceived as an apparatus for manufacturing an interior permanent magnet-type inner rotor, the apparatus being characterized by comprising: a holding mold that can hold a core assembly comprising a rotating shaft, a rotor core and an associated rotating body from one end portion (e.g. at which the associated rotating body is located) and support an end surface side of the rotor core located at the one end portion, the rotor core having a plurality of slots arranged evenly around a shaft hole into which the rotating shaft is fitted, the associated rotating body having a portion that projects beyond an outer diameter of the rotor core; an orienting mold having a housing part that can house the rotor core from other end portion of the core assembly (e.g. at the side of the rotor core), a plurality of orienting yokes that are arranged evenly around the housing part and induce oriented magnetic fields to be applied to the slots, and permanent magnets that are oriented magnetic field sources arranged around the orienting yokes; and a filling mold that fills a flowable mixture into the slots from an end surface side of the rotor core located at the other end portion, the rotor core being housed in the housing part and applied thereto the oriented magnetic fields, the flowable mixture being a mixture of a binder resin heated to a flowable state and anisotropic magnet particles, wherein the interior permanent magnet-type inner rotor is obtained in a state in which the flowable mixture is solidified into anisotropic bond magnets as magnetic poles and the rotating shaft having the associated rotating body is fitted in the interior permanent magnet-type inner rotor.

This manufacturing apparatus of the present invention may preferably further comprise a mold clamping means that clamps the orienting mold and the filling mold or the orienting mold and the holding mold.

(2) First, when the rotating shaft is not provided with any associated rotating body, in particular when the inner rotor is solely used as a single body, it is easy to house (dispose)

an object in the housing part of the orienting mold that also acts as the holding mold and inject the flowable mixture from one ends of the slots into the slots to which the oriented magnetic fields are applied. In the case of the core assembly according to the present invention, however, the rotor core cannot be housed and disposed in the conventional orienting mold because the associated rotating body interferes with the mold. Here, it may be considered to use a split mold obtained by dividing a mold into portions that are movable forward and backward in the diameter direction or in the radial direction, as employed in an ordinary injection molding apparatus using a thermoplastic resin. However, when the oriented magnetic field sources are strong permanent magnets, if such a split mold is used, fine iron power, magnet powder and the like may readily attach to the periphery of the orienting yokes every time the injection is performed, leading to troubles, such as variation in the quality of anisotropic bond magnets due to the variation in the oriented magnetic fields and the like, increase in man-hours for cleaning, and poor workability. In addition, an opening and closing space, mechanism for moving forward and backward (opening and closing), and the like are necessary, which may lead to a large-sized and complicated apparatus and high cost, thus may not be preferred.

In contrast, according to the manufacturing apparatus of the present invention, after the associated rotating body having a large diameter is fixed to the holding mold, the orienting mold is moved from the opposite side (e.g. from above) toward the holding mold to house the rotor core in the housing part located inside the orienting mold. Then, in this state, the flowable mixture is injected into the slots from the opposite side to the associated rotating body (e.g. from above) to form the anisotropic bond magnets which are filled into and molded in the rotor core in the oriented magnetic fields. Thus, according to the manufacturing apparatus of the present invention, the anisotropic bond magnets to be the magnetic poles can be easily filled into and molded in the slots of the rotor core even for a core assembly that includes the inner rotor, the rotating shaft fitted in the inner rotor, and the associated rotating body which is fixed to the rotating shaft and is at least partially larger than the inner rotor in the outward diameter direction.

When the manufacturing apparatus of the present invention is used, the open-end surface side of each slot located at the side of the associated rotating body (e.g. located at the lower side) comes to a closed state by being supported directly or indirectly by the holding mold. This can prevent the filled flowable mixture from leaking out from the open-end surface side. Here, the case in which the open-end surface side is supported indirectly by the holding mold is a case in which the holding mold supports the end surface side of the rotor core via an end plate or the like that is disposed at the end surface in the axis direction of the slot.

The holding method (means) for the core assembly using the holding mold, the supporting method (means) for the end surface side of the rotor core, and the driving method (means) therefor may be considered in various ways. For example, an actuator (such as hydraulically-operated, pneumatically-operated and electrically-operated ones) provided separately from the driving means (mold clamping means) for the mold may be used to operate the holding mold to hold the core assembly. The driving or mold clamping means for the mold may also be utilized. For example, the holding mold may be provided with one or more sliders that cooperate with respective angular cams disposed on the orienting mold and the sliders may be used for holding of the core assembly, supporting of the end surface of the rotor core, and the like, during the mold clamping.

The manufacturing apparatus and manufacturing method of the present invention are closely associated with each other, but one may not necessarily be essential for the other. For example, the manufacturing method of the present invention may not necessarily require using the above-described orienting mold. Moreover, the manufacturing apparatus of the present invention may not only be targeted on those in which the rotor core is shrink-fitted to the rotating shaft. As used in the present description, the "fitting" and relevant terms refer to meanings including not only a case of shrink fitting but also a case of press fitting without shrink fitting.

«Others»

(1) Unless otherwise stated, the term "motor(s)" as referred to in the present description encompasses generators in addition to electric motors. The term "interior permanent magnet-type motor(s)" as referred to in the present description encompasses brushless direct current (DC) motors and the like in which a rotating magnetic field is generated at the side of a stator on the basis of the position of a rotor detected by a detection means such as a hall element, rotary encoder and resolver, in addition to basic synchronous motors in which the rotating speed varies synchronously with the frequency of the alternate current supplied to the coil of stator (armature coil). It should be noted that the brushless DC motors are excellent in the controllability as in the ordinary DC motors because the rotating speed can be varied by varying the DC voltage supplied to an inverter.

(2) As referred to in the present description, being "arranged evenly" or "evenly arranged" means that the pitch of slots or the like arranged in the circumferential direction is even. In the present description, the side near to the rotational center of the rotor may be referred to as an "inner circumferential side" while the side far from the rotational center may be referred to as an "outer circumferential side."

(3) Unless otherwise stated, a numerical range "x to y" as referred to in the present description includes the lower limit value x and the upper limit value y. Various numerical values or any numerical value included in numerical ranges described in the present description may be selected or extracted as a new lower limit value or upper limit value, and any numerical range such as "a to b" may thereby be newly provided using such a new lower limit value or upper limit value.

BRIEF DESCRIPTION OF DRAWINGS

FIG. 1A is a front elevational view of a rotor assy.

FIG. 1B is a plan view of an inner rotor incorporated in the rotor assy.

FIG. 2 is a perspective view of a mold used for filling and molding of anisotropic rare-earth bond magnets, when viewed from below.

DESCRIPTION OF EMBODIMENTS

Figure 3:
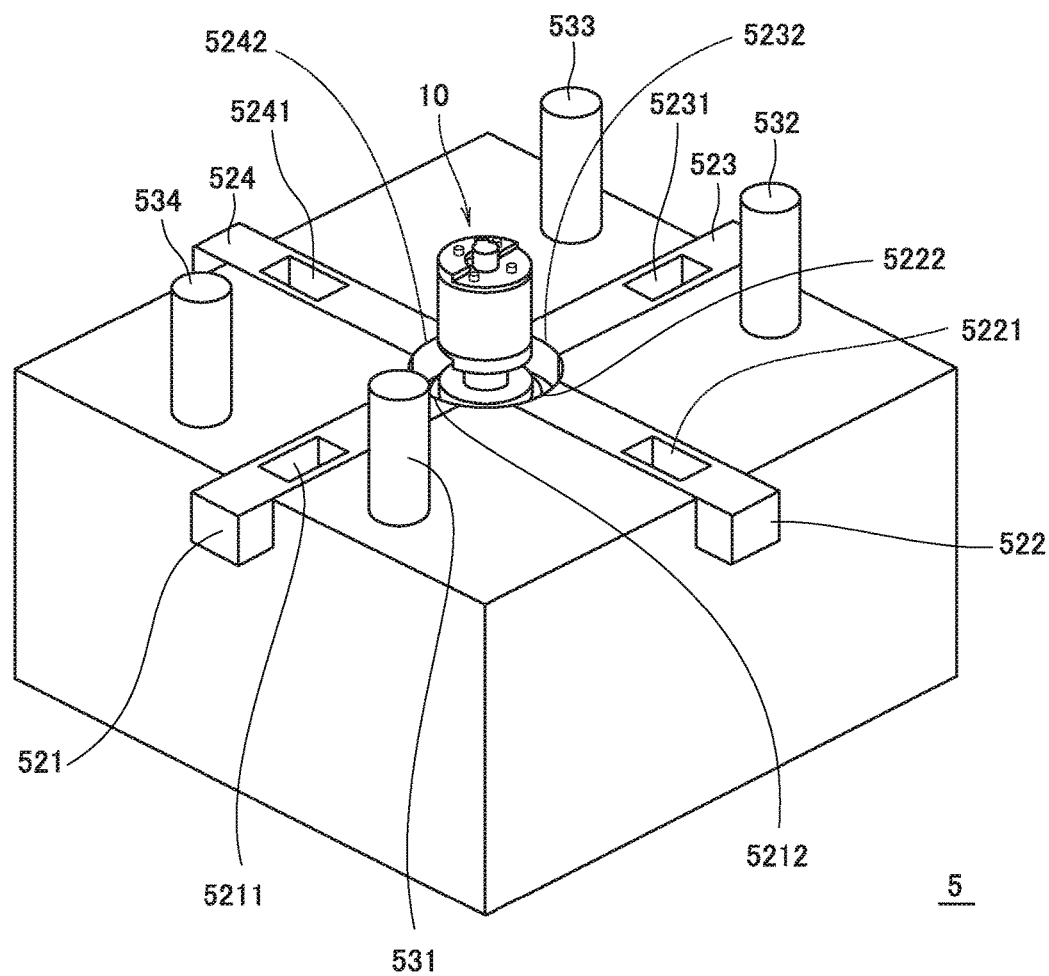
FIG. 3 is a perspective view of a holding mold when viewed from above.
Figure 4:
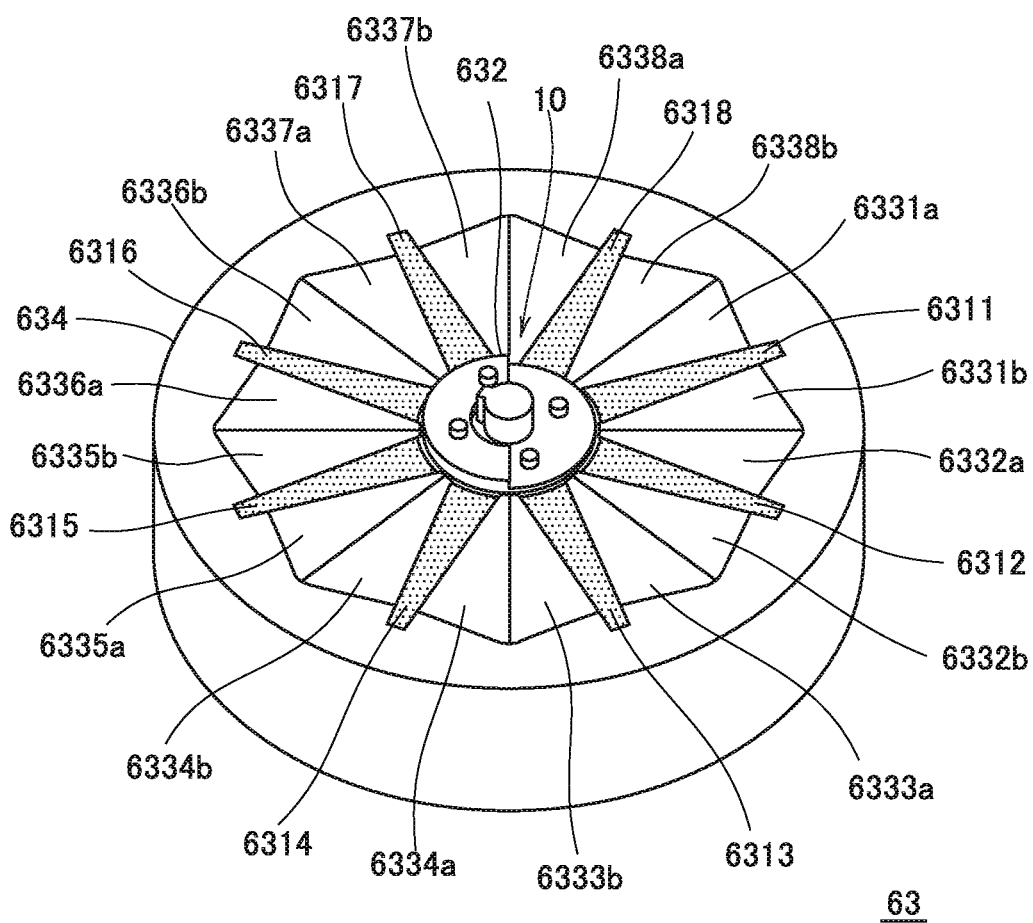
FIG. 4 is a perspective view of oriented magnetic fields body incorporated in an orienting mold when viewed from above.

One or more features freely selected from among the matters described in the present description can be added to the above-described features of the present invention. Which embodiment is the best or not is different in accordance with objectives, required performance, and other factors. Features regarding the manufacturing method, when understood as those in a product-by-process claim, can also be features regarding a product.

«Orienting Mold»

The orienting mold comprises a housing part that houses the rotor core, orienting yokes that are arranged around the housing part, and permanent magnets that are oriented magnetic field sources arranged around the orienting yokes. The housing part may be integrated with the orienting yokes or may also be separate from the orienting yokes, provided that the housing part is in a capable of housing the rotor core.

The orienting yokes are arranged evenly around the outer circumference of the housing part and induce oriented magnetic fields to the slots of the rotor core. Specific shape of the orienting yokes is not limited, but it is preferred that the orienting yokes are arranged to radially elongate in a tapered fashion so that the width in the circumferential direction decreases toward the outer circumferential side (large diameter side) because in this case the permanent magnets can readily be ensured to have a certain volume or more while achieving a downsized orienting mold.

When the permanent magnets as the oriented magnetic field sources are sintered rare-earth magnets, strong oriented magnetic fields can be applied to the slots of the rotor core while achieving a downsized orienting mold. When the oriented magnetic field sources are magnet coils, cooling or other appropriate means is necessary, while on the other hand, when the oriented magnetic field sources are permanent magnets as in the present invention, cooling or the like is unnecessary and the orienting mold can thus be simplified. Moreover, the temperature management for the rotor core during the injection may readily be performed, and in particular a general-purpose injection molding machine can be used, thus it is easy to constitute the production line. To enhance the oriented magnetic fields, the permanent magnets are preferably arranged such that the same poles face the opposing side surfaces of each orienting yoke.

«Rotor Core»

The rotor core is composed of a soft magnetic material and may ordinarily be composed of a powder magnetic core or the like obtained by of a laminate of magnetic steel sheets each coated with insulating layers on both surfaces, or metallic particles coated with an insulator. The material quality of the soft magnetic material is not limited, but it is preferred to use, for example, an iron-based material such as pure iron, silicon steel and alloy steel.

The shape and number of the slots, which are arranged evenly around a shaft hole provided in the middle of the rotor core, are not limited insofar as two or more slots are provided. The slots may be, for example, in a radial form that extends linearly from the center in the radial direction, in a convex form that is convex toward the inner circumferential side, or a multilayer form that comprises a plurality of portions distributed in the radial direction.

«Anisotropic Bond Magnets»

Anisotropic bond magnets in the slots of the rotor core are composed of anisotropic magnet particles (powder) and a binder resin. The type of the anisotropic magnet powder to be used is not limited, but it is preferred to use anisotropic rare-earth magnet powder of high performance. For example, Nd—Fe—B-based magnet powder, Sm—Fe—N-based magnet powder, Sm—Co-based magnet powder, or other appropriate magnet powder may preferably be used. The anisotropic magnet powder is not limited to a single type of powder, and a mixed powder obtained by mixing two or more types of powders may also be used. The mixed powder is not limited to those in which the component composition is merely different, and those in which the particle diameter distribution is different may also be used. For example, coarse powder and fine powder of Nd—Fe—B-based magnet powder may be combined or coarse powder of Nd—Fe—B-based magnet powder and fine powder of Sm—Fe—N-based magnet powder may also be combined. By using the anisotropic magnet powder as the above, the magnet particles can be highly dense and the high-performance inner rotor and IPM motor can therefore be obtained. The anisotropic bond magnets according to the present invention may be those in which other particles such as isotropic magnet particles and ferrite magnet particles are mixed, provided that the anisotropic magnet particles exist.

Known materials including rubber can be used as the binder resin. In consideration of the properties such as flowability and filling property of the flowable mixture, the binder resin may preferably be a thermoplastic resin. In particular, when the anisotropic bond magnets according to the present invention are formed by injection molding (when the filling step is an injection step), it is preferred that the binder resin is a thermoplastic resin. Examples of the thermoplastic resin include, for example, polyethylene, polypropylene, polystyrene, acrylonitrile/styrene resin, acrylonitrile/butadiene/styrene resin, methacrylic resin, vinyl chloride, polyamide, polyacetal, polyethylene terephthalate, ultrahigh molecular weight polyethylene, polybutylene terephthalate, methylpentene, polycarbonate, polyphenylene sulfide, polyether ether ketone, liquid crystal polymer, polytetrafluoroethylene, polyetherimide, polyarylate, polysulfone, polyether sulfone, polyamideimide, and polyamide. Thermoset resin may also be used as necessary, such as epoxy resin, unsaturated polyester resin, amino resin, phenol resin, polyamide resin, polyimide resin, polyamideimide resin, urea-formaldehyde resin, melamine resin, urea resin, diallyl phthalate resin, and polyurethane. When the anisotropic bond magnets according to the present invention are formed by transfer molding, the binder resin may also be a thermoset resin such as epoxy resin.

The above-described flowable mixture may be prepared by heating raw material pellets or the like of anisotropic magnet particles and a binder resin to a temperature of about 280 to 310 decrees C which is lower than the Curie point of the anisotropic magnetic particles and is not lower than the melting point of the binder resin, for example, in the case of polyphenylene sulfide. This flowable mixture is injected into the slots and then cooled, for example, to about 80 to 160 degrees C. thereby to solidify into the anisotropic bond magnets which are filled in the slots.

«Use Application of Interior Permanent Magnet-Type Motor»

Use application of the IPM motor according to the present invention is not limited, but the IPM motor according to the present invention is suitable, for example, for a vehicle drive motor used in an electric car, hybrid car, railroad vehicle or the like or for a home appliance motor used in an air conditioner, refrigerator, washing machine or the like.

EXAMPLES

The present invention will be more specifically described with reference to an example. In the present example, description will be made to a method and apparatus for manufacturing a rotor assy (rotor assembly or core assembly) that is used in a driving motor (IPM motor) of a compressor for air conditioners.

«Rotor Assy»

FIG. 1A is a front elevational view of a rotor assy A as an example in which the inner rotor according to the present invention is used. FIG. 1B is a plan view of a rotor core 1 that is incorporated in the rotor assy A. For descriptive purposes, directions of the arrows illustrated in FIG. 1A represent the upper and lower directions.

The rotor assy A comprises an inner rotor 10, a rotating shaft 20, and a load body 30 (associated rotating body). Rotor core 1 that constitutes the inner rotor 10 is, as illustrated in FIG. 1B, and has a shaft hole 11 provided at the center and having a key groove 111, eight approximately U-shaped slots 121 to 128 (referred collectively to as a "slot 12" or "slots 12") that are arranged evenly around the shaft hole 11, and four rivet holes 131 to 134 (referred collectively to as a "rivet hole 13" or "rivet holes 13") that are evenly arranged between the shaft hole 11 and the slots 12. The rotor core 1 is configured by stacking silicon steel plates punched out into a shape as illustrated in FIG. 1B.

End plates 41 and 42 are fixed to the upper and lower end surfaces, respectively, of the rotor core 1. The end plates 41 and 42 close the upper and lower openings, respectively, of the slots 12 of the inner rotor 10. The end plate 41 is formed with eight small filling holes 4111 to 4118 (referred collectively to as a "filling hole 411" or "filling holes 411," see FIG. 5) that communicate respectively into the slots 121 to 128. In addition, balance weights 43 and 44 are fixed on the end plates 41 and 42, respectively. The rotor core 1, the end plates 41 and 42, and the balance weights 43 and 44 are fastened together using four rivets 451 to 454 (referred collectively to as a "rivet 45" or "rivets 45") that penetrate the rivet holes 13.

Anisotropic rare-earth bond magnets b1 to b8 (referred collectively to as an "anisotropic rare-earth bond magnet b" or "anisotropic rare-earth bond magnets b") are formed in respective slots 12 of the rotor core 1 by injection molding via the filling holes 411. In the present example, the inner rotor 10 refers not only to the rotor core 1 and the anisotropic rare-earth bond magnets b but also to the end plates 41 and 42 and balance weights 43 and 44 which are fixed to the rotor core 1 using the above-described rivets 45.

The load body 30, which is a driving part that drives a compressor for air conditioners, comprises flanges 31 and 32 and a crank 33 interposed between the flanges 31 and 32. They are in an outer form that projects in the radial direction than the inner rotor 10.

The load body 30 is fixed to the rotating shaft 20 by press fitting (press fitting step) and the inner rotor 10 is fixed to the rotating shaft 20 by shrink fitting (shrink fitting step). In the shrink fitting, the inner rotor 10 is fixed to the rotating shaft 20 such that the rotor core 1 is heated to about 200 to 500 degrees C. and the rotating shaft 20 is inserted into the shaft hole 11. The rotor assy A (before being filled with the anisotropic rare-earth bond magnets b) is thus formed. After the shrink fitting of the rotor core 1, the slots 12 are filled with a flowable mixture from respective filling holes 411 (injection step) thereby to form the magnetic poles composed of the anisotropic rare-earth bond magnets b in the inner rotor 10. Transfer molding is also possible as substitute for the injection molding. While thermoplastic resin used in the injection molding is solidified by cooling, the thermoset resin used in the transfer molding is solidified by heating in a mold or by a curing process (heat treatment for hardening) after the transfer molding.

«Injection Molding of Anisotropic Rare-Earth Bond Magnets»

Description will then be made to a process of molding the anisotropic rare-earth bond magnets b into the slots 12 of the rotor core 1 which is shrink-fitted to the rotating shaft 20. Molding of the anisotropic rare-earth bond magnets b can be performed by setting a mold D as illustrated in FIG. 2 to a general-purpose vertical-type injection molding machine. For descriptive purposes, directions of the arrows illustrated in FIG. 2 represent the upper and lower directions.

(1) Mold

The mold D has a three-layer structure of a holding mold 5, orienting mold 6, and injecting mold 7. As illustrated in FIG. 2 and FIG. 3, the holding mold 5 is composed of a base 51, four slide cores 521 to 524 (referred collectively to as a "slide core 52" or "slide cores 52") that each slide so as to be movable forward and backward between the middle of each side of the base 51 and the center of the base 51, and guide pins 531 to 534 (referred collectively to as a "guide pin 53" or "guide pins 53") that project in the vertical direction from the upper surface side of the base 51.

The slide cores 52 are in an approximately rectangular column-like form and fitting holes 5211 to 5241 are formed in respective slide cores 52 each at the middle but rather near the outer side. Supporting parts 5212 to 5242 are formed at middle sides of respective slide cores 52 (center sides of the holding mold 5). The supporting parts 5212 to 5242 are located between the inner rotor 10 and load body 30 of the rotor assy A to surround the rotating shaft 20 and support the end plate 42 from below. Middle and lower portion of the base 51 has a space (not illustrated) that houses the load body 30 fixed to the rotating shaft 20, and is further formed with a shaft hole (not illustrated) into which the lower end portion of the rotating shaft 20 is inserted.

As illustrated in FIG. 2, the orienting mold 6 has a base 61, four angular cams 621 to 624 (referred collectively to as an "angular cam 62" or "angular cams 62") that project from the lower surface side of the base 61 in downward oblique directions, oriented magnetic field body 63 that is disposed at the middle of the base 61, and guide holes 641 to 644 (referred collectively to as a "guide hole 64" or "guide holes 64") that fit respectively with the guide pins 531 to 534 provided at the upper surface side of the base 51 of the holding mold 5.

The oriented magnetic field body 63 is composed of eight orienting yokes 6311 to 6318 (referred collectively to as an "orienting yoke 631" or "orienting yokes 631") that project radially and slenderly toward the outer circumferential side, a cylindrical housing part 632 that bridges the orienting yokes 631 in a circular arc fashion and has an inner circumferential surface continuing smoothly at the middle, sixteen permanent magnets 6331*a* to 6338*a* (referred collectively to as a "permanent magnet 633*a*" or permanent magnets 633*a*") and permanent magnets 6331*b* to 6338*b* (referred collectively to as a "permanent magnet 633*b*" or permanent magnets 633*b*") that are to be oriented magnetic field sources arranged such that the same poles face the opposing side surfaces of each orienting yoke 631 in the circumferential direction, and a case 634 that houses the above components. Each of the permanent magnets 633*a* and 633*b* is formed of a sintered rare-earth magnet.

Arrangement of the orienting yokes 631 and permanent magnets 633*a* and 633*b* will be additionally described in more detail. For example, the permanent magnets 6331*a* and the permanent magnets 6331*b* are disposed such that respective S poles are in contact with the side surfaces of the orienting yoke 6311 in the circumferential direction while the permanent magnets 6332a and the permanent magnets 6332b are disposed such that respective N poles are in contact with the side surfaces of the adjacent orienting yoke 6312 in the circumferential direction. Such an arrangement allows the oriented magnetic fields to be effectively applied in opposite directions to adjacent ones of the slots 12 of the rotor core 1 housed in the housing part 632.

Figure 5:
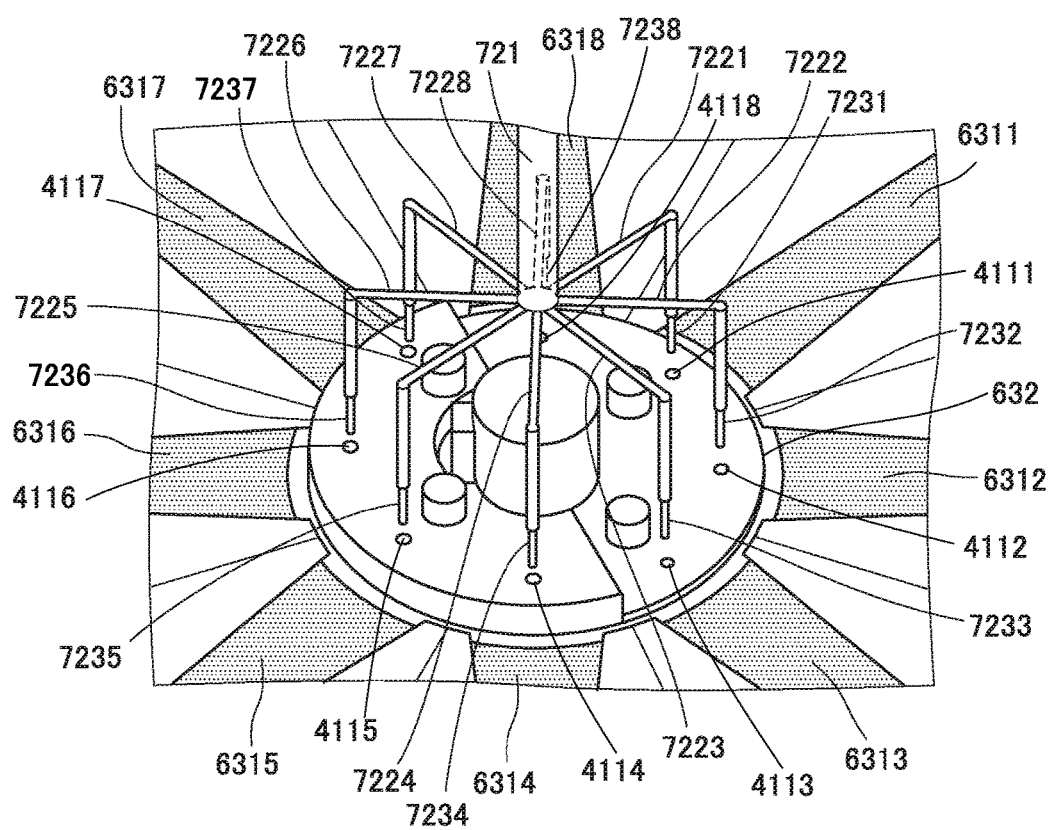
FIG. 5 is a perspective view illustrating a scene when filling slots of a rotor core housed in the orienting mold with a flowable mixture.

As illustrated in FIG. 2, the injecting mold 7 is configured such that a flow channel (not illustrated) to be a path for the flowable mixture of anisotropic rare-earth magnet power and a binder resin (thermoplastic resin) is formed inside the middle of the base 71. This flow channel, as illustrated in FIG. 5, comprises a spool 721, eight runners 7221 to 7228 (referred collectively to as a "runner 722" or "runners 722") that merge into the spool 721, and thin pin gates 7231 to 7238 (referred collectively to as a pin gate "723" or "pin gates 723") that communicate into respective runners 722. End portions of the pin gates 723 are connected to respective filling holes 411 of the end plate 41 and the slots 12 are filled with the flowable mixture through the pin gates 723.

(2) Injection Molding

Description will then be directed to a step of setting up the above-described mold D in a general-purpose vertical-type injection molding machine and filling the slots 12 with the flowable mixture. The previously-described rotor assy A (before being filled with the anisotropic rare-earth bond magnets b) is set with the load body 30 positioned at the lower side from above to the middle of the holding mold 5. During this operation, the temperature of the rotor core 1 is to be a temperature (e.g. 130 to 160 degrees C.) suitable for injection. When the temperature of the rotor core 1 is unduly high immediately after the shrink fitting, temperature adjustment may be performed as necessary, such as by air cooling (temperature adjusting step).

Then, the slide cores 52 are moved toward the center of the holding mold 5 while at the same time the orienting mold moves down toward the holding mold 5. During this operation, the orienting mold attracts the load body 30 by the magnetic attractive force. At this time, the upper end surface of the load body 30 comes into contact with the (inner circumferential) lower end surfaces of the supporting parts 5212 to 5242 and the supporting parts 5212 to 5242 surround the rotating shaft 20. This operation puts the rotor assy A into a state in which its movement in the axial direction is provisionally constrained. As a result, the rotary assy A is prevented from unexpectedly attaching to the oriented magnetic field body 63 by its magnetic force when the orienting mold 6 moves down toward the holding mold 5.

When the orienting mold 6 is moved downward from the side of the rotor core 1 to the rotor assy A in this state, the upper surface of the holding mold 5 and the lower surface of the orienting mold 6 come close to each other while the guide pins 53 of the holding mold 5 fit into respective guide holes 64 of the orienting mold 6. During this operation, the angular cams 62 fit into respective fitting holes 5211 to 5241 of the slide cores 52 and the slide cores 52 move toward the center of the holding mold 5 as the angular cams 62 move downward. This causes the supporting parts 5212 to 5242 of the slide cores 52 to be located between the inner rotor 10 and the load body 30, and the supporting parts 5212 to 5242 surround the outer circumference of the rotating shaft 20 between the inner rotor 10 and the load body 30 and support the end plate 42 of the inner rotor 10 from the lower side. Thus, the load body 30 connected to the inner rotor 10 via the rotating shaft 20 is also held.

Such cooperation of the holding mold 5 and the orienting mold 6 ensures that the holding mold 5 holds the rotor assy A, and the rotor core 1 is housed in the housing part 632 of the oriented magnetic field body 63. Since the oriented magnetic field body 63 uses the permanent magnets 633a and 633b (referred collectively to as "permanent magnets 633") as the oriented magnetic field sources, there is obtained a state in which a certain oriented magnetic fields are applied to each slot 12 at the stage when the rotor core 1 is housed in the housing part 632.

The injecting mold 7 also moves downward in a cooperative manner with the orienting mold 6, and the lower surface of the injecting mold 7 and the upper surface of the orienting mold 6 come into close contact with each other. This operation causes a state in which the end part of each pin gate 723 is connected with the corresponding filling hole 411 of the end plate. In this state, the flowable mixture, which is composed of anisotropic rare-earth magnet particles and a binder resin, is fed by pressure from the general-purpose vertical-type injection molding machine to the spool 721 and then filled into the slots 12 from respective filling holes 411 via respective runners 722 and pin gates 723. During this operation, the lower end side opening of each slot 12 of the rotor core 1 is completely closed by the end plate 42, which is supported by the upper end sides of the supporting parts 5212 to 5242 of the slide cores 52, and the mold clamping force is thereby removably supported.

After the filling of the flowable mixture is completed, the pressure feeding of the flowable mixture is stopped and this state is maintained for several seconds to several tens of seconds. This allows the flowable mixture to become solidified into the anisotropic rare-earth bond magnets b. Each anisotropic rare-earth bond magnet b is a permanent magnet obtained by injection molding in the state in which the strong oriented magnetic fields are applied thereto, and thus already exhibits a strong magnetic force even without being magnetized.

When the orienting mold 6 and the injecting mold 7 are moved upward from the holding mold 5 to open the mold, the rotor assy A is obtained, having the anisotropic rare-earth bond magnets b which are magnetized as the magnetic poles. An IPM motor can be obtained by incorporating this rotor assy A into a stator. Movement of the orienting mold 6 and injecting mold 7 was performed using a driving means (mold clamping means), such as a hydraulic actuator, equipped in the general-purpose vertical-type injection molding machine.

REFERENCE SIGNS LIST

1: Rotor core
12: Slot
10: Inner rotor
5: Holding mold
6: Orienting mold
7: Injecting mold
A: Rotor assy (Core assembly)
b: Anisotropic rare-earth bond magnet

The invention claimed is:

1. An apparatus for manufacturing an interior permanent magnet-type inner rotor, the apparatus comprising:
   a mold having a three-layer structure of a holding mold, an orienting mold, and a filling mold;
   the holding mold, the orienting mold, and the filling mold being stackable and dividable in that order,
   the holding mold having a space configured to house an associated rotating body fixed to a rotating shaft, the rotating body having a portion that projects beyond an outer diameter of a rotor core, and the holding mold having movable forward and backward sliders that are configured to support an end side of the rotor core;

the orienting mold having a cylindrical housing part that is smaller than the space of the holding mold and that is configured to house the rotor core, a plurality of orienting yokes that are arranged evenly around the cylindrical housing part and which induce oriented magnetic fields to be applied to slots in the rotor core, and permanent magnets that are oriented magnetic field sources arranged between the orienting yokes; and the filling mold being configured as a flow channel for a flowable mixture to flow into the slots of the rotor core from the other end side of the rotor core, the rotor core being configured to be housed in the cylindrical housing part and having applied thereto the oriented magnetic fields, the flowable mixture being a mixture of a binder resin heated to a flowable state and anisotropic magnet particles.

2. The apparatus for manufacturing an interior permanent magnet-type inner rotor as recited in claim 1, wherein the holding mold is formed with a shaft hole configured for an end portion of the rotating shaft to be inserted into.

\* \* \* \* \*